May 7, 1929.  T. W. W. FORREST  1,711,728
DRIED FRUIT PRODUCT
Filed June 17, 1925
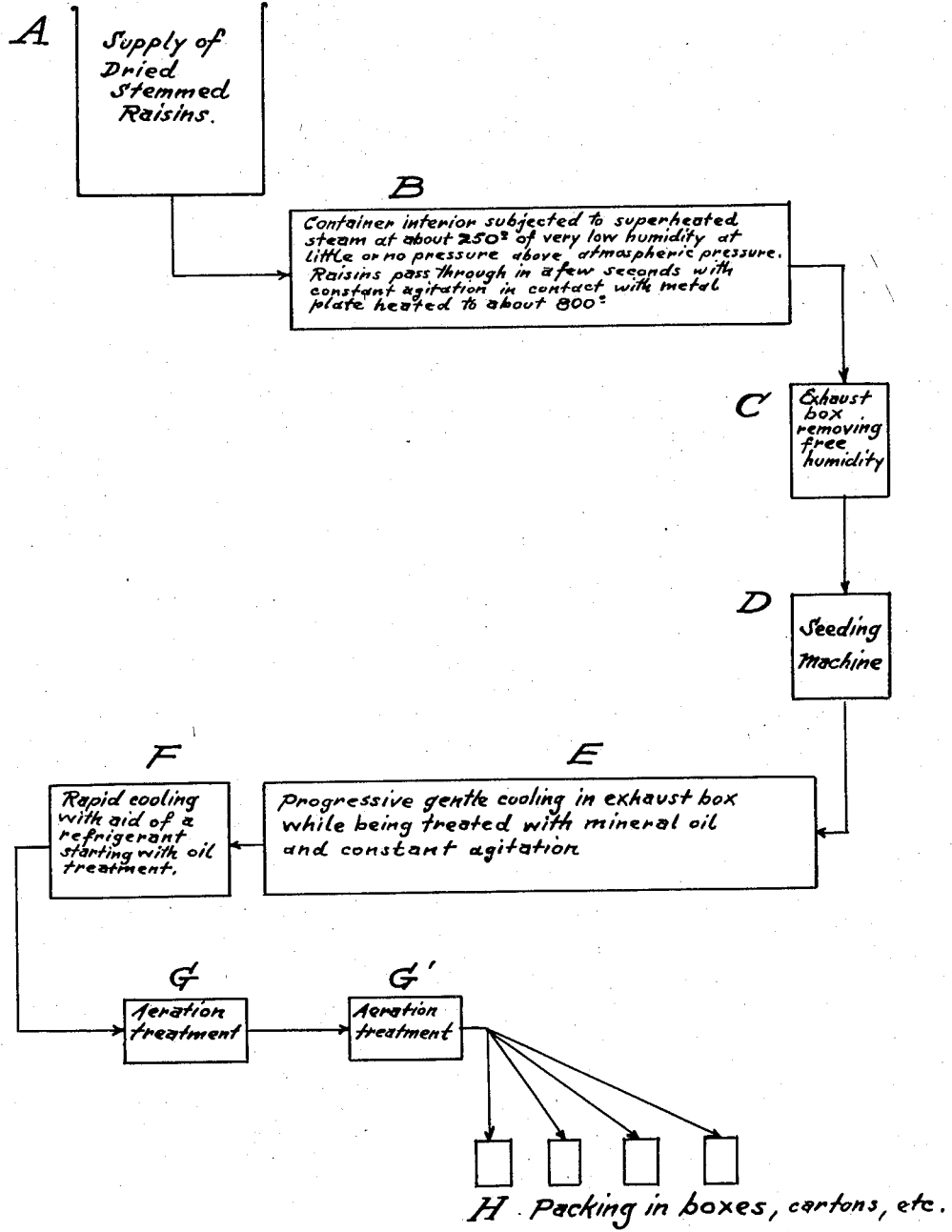
INVENTOR.
Thomas W.W. Forrest.
BY Miller Henry & Boyken
His ATTORNEYS Patented May 7, 1929.

1,711,728

UNITED STATES PATENT OFFICE.

THOMAS W. W. FORREST, OF OAKLAND, CALIFORNIA, ASSIGNOR TO SUN MAID RAISIN GROWERS OF CALIFORNIA, OF FRESNO, CALIFORNIA, A COOPERATIVE ASSOCIATION OF CALIFORNIA.

DRIED-FRUIT PRODUCT.

Application filed June 17, 1925. Serial No. 37,675.

This invention relates to dried fruits, especially seeded raisins, and has for its object a dried fruit article of manufacture particularly seeded muscat raisins—which will exhibit superior physical qualities over prior fruit articles of similar nature.

Two of these qualities are:

1st.—That the raisins though unctuous may be packed in boxes or cartons yet will always be substantially free for pouring out and will not form a solid or united mass.

2nd.—That the raisins will bulk considerably larger than raisins of the same grade manufactured by prior methods.

As the qualities mentioned may be developed in raisins by various processes, and the article of manufacture itself is distinctive and instantly detectable by anyone at all familiar with raisins, the claims to this application will be confined to the article per se as it is possible that other methods of manufacture will produce the article once its value has been demonstrated to the public, and the processes by which I produce the article will be prosecuted in separate applications as follows:

Serial No. 1951, filed January 12th, 1925, granted Patent No. 1,607,886.

Serial No. 37,676 filed June 17, 1925.

Before describing my improved raisin product and in order to clearly draw attention to its distinguishing features it is pointed out—

That seeded muscat raisins as commonly known are an article of manufacture, that is, they have been put through successive steps of drying, stemming, softening, seeding and packing.

Such raisins are usually packed in two forms for the market, in wooden boxes holding about thirty pounds of fruit and in paper cartons of about one pound or less, the wooden boxes being used principally by bakers, and the cartons by the housewife.

In both forms the packages reveal when opened, a solidly agglutinated mass of raisins which must be forcibly broken up in order to distribute the raisins in dough, puddings, pies and the like, and in the case of the baker this is a considerable amount of work for even a small lump of tightly adhering raisins would be objectionable and if a whole box of such agglutinated raisins were dumped into the dough mixer it would wreck the machine.

Besides this, a certain amount of syrup or caramelized sugar drains to the lower part of the package if long standing, and in the wooden boxes this amounts to a positive nuisance, sometimes running out of the corners of the boxes and also cementing as it were the raisins to the box so that many must be pried loose.

In paper carton packages this stickiness of the fruit requires the lining of the cartons with paraffined paper which must be pulled from the raisins after taking them from the cartons before the mass is broken up.

This stickiness and exuding syrup of the raisins is the result of the heat and moisture necessarily applied to the raisins after capstemming to soften them for seeding and is probably due to the caramelizing of some of the sugar content of the fruit, and apparently, this unsatisfactory sticky packing of processed, seeded, muscat raisins has been accepted by all as a necessary natural attribute of raisins,—as inseparable from them as the smell from onions— and while attempts have been made to improve the flavor and unctuousness of such raisins, no deliberate attempt appears to have been made to materially change their physical characteristics and overcome the undesirable features mentioned, yet without impairment of their edible qualities.

I have discovered that by a certain method of processing the raisins described more fully in my co-pending applications referred to, the raisins are not only improved in edible quality but gain the two very desirable additional qualities as schedulized on page 1 hereof, and I have demonstrated that seeded muscat raisins can be commercially produced which are of soft unctuous consistency, substantially homogeneous from the outer skin clear through, which when packed either in cartons or boxes will remain soft yet will not agglutinate or exude syrup even after months of standing, but will at all times remain separate or free running so that a large box may be opened and dumped directly into the dough of a mixing machine.

These raisins require no paraffined lining when packed in cartons and will not adhere to the carton, and lastly the raisins are swelled or puffed up so as to bulk from 16 to 20% greater than the same grade of raisins as heretofore obtainable.

One method by which these new raisins may be produced from the dry stemmed raisins is by subjecting them to—

1st.—A rapid intense superficial heating of their outer skins while also subject to the action of a superheated atmosphere of low humidity at substantially atmospheric pressure.

2nd.—A rapid seeding of the thus heated raisins.

3rd.—A gentle progressive cooling.

4th.—A rapid terminating cooling close to air temperature.

5th.—An aeration to bring them to uniformity.

6th.—A treatment with a tasteless mineral oil (such as oil of petrolatum) during step 3 and perferably also at the beginning of step 4.

It is manifest that these steps of treatment may be carried out by various forms of apparatus and as I have other patents pending on such apparatus—filed under Serial Nos. 751,567 and 751,568 both filed Nov. 22, 1924, 37,677 and 37,678 both filed June 17, 1925—the method of manufacture is herein indicated in diagrammatic form, reference being had to the accompanying figure in which—

"A" represents the supply of dried raisins as received from the cap stemmer, "B" a closed container into which the dry raisins are fed through a closed channel or gate and rapidly passed through in a few seconds while being turned over in contact with a plate heated to about 800° F. and at the same time subjected to superheated steam at about 250° F.

This steam is of little or no pressure above atmosphere and of so low a moisture content that it is virtually a gas, (being quite invisible if blown out into the air).

From container "B" the raisins follow an enclosed passage to an exhaust box "C" at which point any moist vapor is withdrawn, and from box "C" the hot raisins pass through a seeder "D" and at once through an enclosed passage to a container "E" where they are rapidly moved along while treated with atomized mineral oil and subject to exhaust action.

In container "E" the raisins are subject to the oil treatment and a gentle cooling and after being lowered sufficiently in temperature they are passed through a compartment "F" where they preferably receive a further oil treatment while subject to a rapid cooling preferably through means of a refrigerant, after leaving compartment "F" the raisins are preferably further reduced to a uniform air temperature by succeeding aeration as at G.G′ and then immediately packed into boxes or cartons "H".

The entire series of operations occupies but a minute or two of time, the raisins being but a few seconds in the various steps of treatment and the extremely rapid passage of the raisins prevents their burning and causes a progressive action from the skin inwardly making the raisins extremely homogeneous with apparently no dividing line between the skin and flesh and at the same time a general puffing or swelling of the raisin body so that it maintains a permanent resilient bulk noticeable at once over other raisins.

These raisins are not sticky as are other processed seeded raisins, no free caramel or sticky juices to amount to anything are discernible and the raisins have practically no tendency to adhere to one another, even without the oil treatment, but with the addition of this treatment an invisible (to the naked eye) tasteless film of oil is formed on the skin of each raisin which effectually insulates it from its neighbor to such a degree that a handful may be tightly compressed for some time and yet when dropped upon a table they will readily break apart and separate, and further, this oil film has the capacity of protecting the raisin against atmospheric and bacteriological influences to a great degree and preserve it in unctuous condition.

It will thus be seen that my improved raisins form a new article of manufacture of great merit and would be distinguished and chosen by any user of raisins without the slightest hesitation over processed seeded raisins as now on the market.

Therefore, since the same treatment can be used to advantage either in whole or part with other dried fruits such as currants, prunes, figs, etc. I feel entitled to progressive claims on dried processed fruit having some or all of the characteristics mentioned, as a new article of manufacture, for as far as I am aware it has not been known before my invention.

I claim:

1. As an article of manufacture, dried fruit which is permanently swollen to abnormal bulk.

2. As an article of manufacture, dried fruit of a given grade which is permanently swollen to abnormal bulk with respect to standard dried fruit of similar grade.

3. As an article of manufacture, dried fruit of a given grade which is permanently swollen to abnormal bulk with respect to standard dried fruit of similar grade while retaining the normal flavor.

4. A food product composed of raisins, each individual raisin being covered with a film of liquid petrolatum.

5. A food product composed of dried fruits, each separate piece of fruit having a covering of petrolatum.

THOMAS W. W. FORREST.